Sept. 1, 1953
F. KESSLER
2,650,950
TELEPHONE LINE LOCKOUT ADAPTER
Filed May 26, 1948
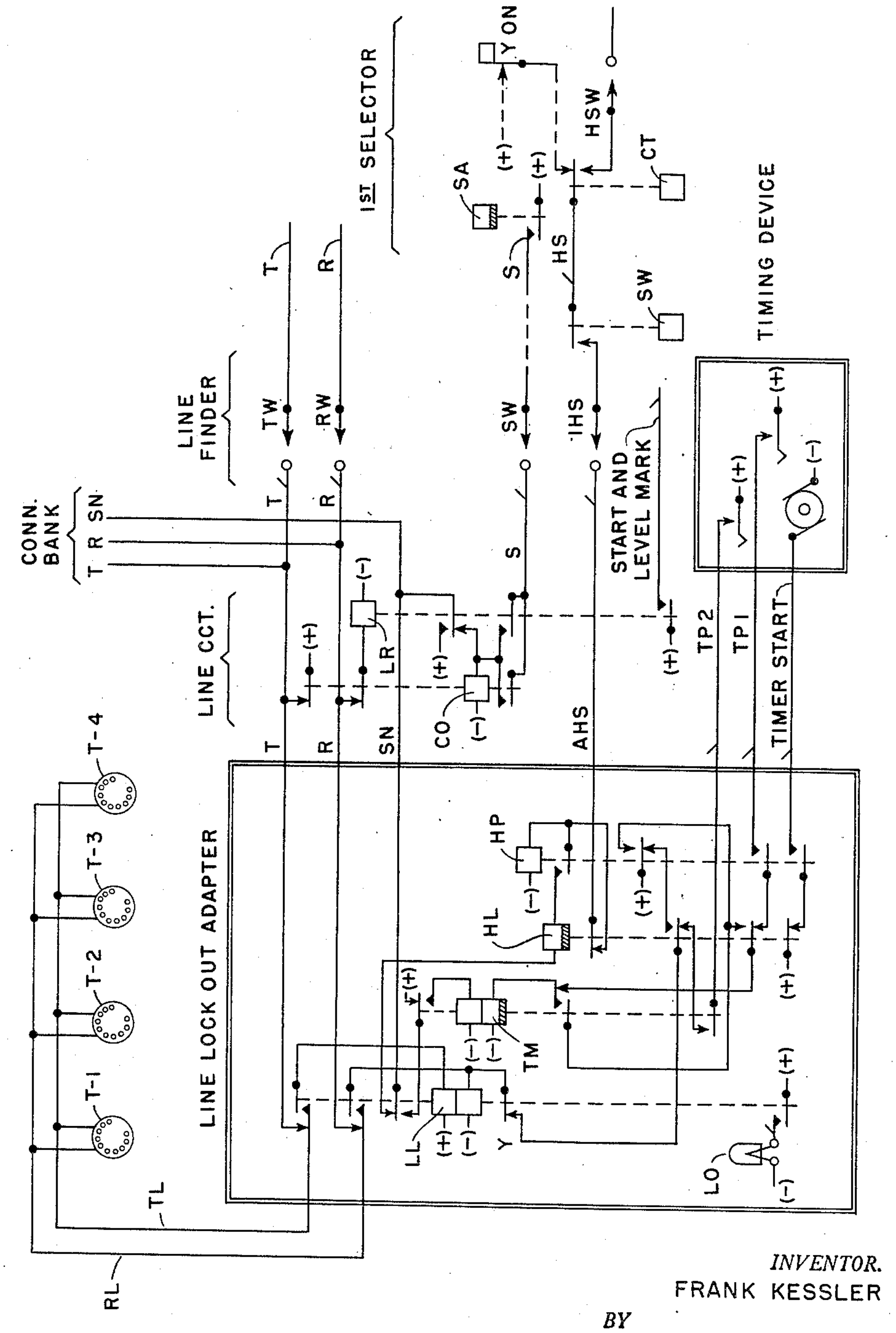
*INVENTOR.*
FRANK KESSLER
*BY*
Winfred T. Powell
ATTORNEY Patented Sept. 1, 1953 2,650,950

UNITED STATES PATENT OFFICE 2,650,950

TELEPHONE LINE LOCKOUT ADAPTER

Frank Kessler, Rochester, N. Y., assignor to Stromberg-Carlson Company, a corporation of New York Application May 26, 1948, Serial No. 29,385

10 Claims. (Cl. 179—18)

This invention relates to automatic telephone systems and it more particularly applies to a line lockout adapter for the line circuits of such systems.

The object of the present invention is the provision of an improved line circuit arrangement, whereby the usual two-relay line circuit may be provided and, when necessary to provide the lockout feature in connection with a two-relay line circuit, it is only necessary to add the line lockout adapter, thereby changing the line circuit from non-lockout to lockout operation.

A feature of the present invention is a line lockout adapter arrangement for connection to certain individual or party lines for the purpose of providing a clearing out and locking out operation when such lines are subject to numerous permanent conditions, such as may be caused by some party on the party or individual line leaving the receiver off or by temporary short circuit or grounded line conditions.

Further features of the present invention relate to the particular arrangement of the circuit elements whereby the above and additional features are attained.

The invention and various features of improvement comprised therein will be described hereinafter in connection with the accompanying drawing which illustrates in diagrammatic form a telephone line, with four sub-stations connected thereto, leading through a line lockout adapter to a two-relay line circuit, which line circuit is selected by an idle line finder of a group when a call is initiated on the illustrated line.

For the purpose of simplifying the drawing and facilitating the explanation, the various parts and circuits constituting the embodiment of the invention have been shown diagrammatically and certain conventional illustrations have been employed, the drawing having been made more with the purpose of making it easy to understand the principles and mode of operation than with the idea of illustrating the specific construction and arrangement of parts that would be actually employed in practice. For example, the various relays and their contacts are illustrated in a conventional manner, with all of the contacts controlled by a particular relay being associated with this relay by means of a dashed line. The negative side of the common exchange battery is indicated by (−) and the positive side of the exchange battery, which is usually grounded, is illustrated by (+).

For convenience in describing the operation of the disclosed invention, it will be assumed that a call is originated from one of the substations T–1, T–2, T–3 or T–4 associated with the line appearing in the upper left hand portion of the drawing. It will first be assumed that this line is connected directly to the illustrated four conductor line circuit identified by the letters T, R, SN, and AHS and that the line lockout adapter is not used. Under this assumption, the tip and ring line conductors TL and RL are connected directly to conductors T and R leading to the line circuit, the sleeve conductor SN extends only from the connector bank to the contact of line relay LR, the auxiliary conductor AHS is not used and of course the timer start conductor, the time pulse conductors TP1 and TP2 are not used.

When the receiver is removed at the calling station, the closed circuit across the line conductors effects the operation of line relay LR over a circuit extending from (+), break contact of cut off relay CO, tip line conductor, calling substation, ring line conductor, break contact of relay CO and winding of relay LR to (−). The operation of relay LR immediately applies (+) to sleeve conductor SN leading to the connector banks for making this line busy. Relay LR also applies (+) to the start and level mark common conductor for starting the allotted line finder of a finder-selector link searching for the calling line. The illustrated finder-selector link includes an interconnecting trunk comprising leads T, R, S, and HS. Relay LR also connects (−) through the winding of relay CO to sleeve conductor S leading to the terminal in the line finder banks for marking the terminal of the calling line. The level in which the calling line is located is marked by the (+) potential connected to the start and level mark conductor. This start and marking circuit arrangement may be the same as illustrated in applicants' prior application Serial No. 20,745, filed April 13, 1948, and assigned to the same assignee as the present invention. The start and level mark conductor in the present drawing may correspond to "Level 2" in said prior application.

As explained in the above mentioned prior application, when the allotted finder switch reaches the marked level, identified by (+) on the "Level 2" conductor, the finder switch will be changed from its primary to its secondary operation, after which it will be advanced into the level to the point to which the calling line is connected. The finder switch will be stopped on the terminal associated with the calling line and relay CO will be operated and locked for opening up and releasing relay LR, which in turn disconnects (+) from the common start and level marking conductor. The calling line is now maintained busy in the connector banks by (+) coming back over finder wiper SW, conductor S, make contact of relay CO, break contact of relay LR and conductor SN leading to the connector bank sleeve terminals associated with the calling line. When the connection is released, (+) is removed from conductor S for releasing relay CO, which in turn restores the line circuit to normal.

It will now be assumed that it is desired to make the illustrated line circuit a line lockout circuit. This may be for various reasons, such as changing the line from an individual to a party line, changing the party line from a non-lockout to a lockout circuit or for applying the time release feature to the line circuit because this particular line circuit may have developed frequent "permanent" conditions which ties up the trunking facilities of the system. An economy is realized in connection with the selector circuits when the proposed line lockout adapter is connected to a line, since the time release operation is provided in the adapter circuit and not in the selector, as will be later described.

Assuming that the illustrated line circuit is equipped with the line lockout adapter, it will be explained how the circuits function in connection with a call to this line and in connection with a call from this line. Assuming first that the line is idle and that it is selected at a connector, the (+) potential applied to sleeve conductor SN in the connector banks is extended through the break contact of relay LR and the winding of relay CO of the line circuit to (−) for operating this latter relay, which in turn removes the battery bridge from the terminals of the called line. The ringing and trunking circuits from the connector are now extended to the conductors of the called line by way of the T and R conductors in the connector bank and break contacts of line lockout relay LL of the adapter to the called line. When the connection is released, relay CO is restored to normal and the line circuit is placed in its normal condition.

It will now be explained how the circuits function in connection with an originating call from the illustrated line circuit, in which this connection is released in the normal manner and in which the line lockout adapter is used.

When the receiver is removed at the substation on the calling line a circuit is closed for operating relay LR of the line circuit, this circuit being the same as previously described. The operation of relay LR makes the calling line busy in the connector bank, it starts the allotted line finder searching for the level and the point in the level to which the calling line is connected and the cut off relay is operated for opening up and releasing relay LR when the calling line is found. The circuit for operating the cut off relay extends from (+), make contact of relay SA of the first selector associated with the calling line finder (relay SA being operated by means of a preliminary impulse in the manner described in my above identified application), wiper SW of the line finder, conductor S, make contact of relay LR and winding of relay CO to (−). Relay CO closes a locking circuit for itself including its lower make contact for maintaining this relay energized after the release of relay LR. Relay SW of the line finder is operated when the line finder reaches the terminals associated with the calling line by means over a circuit not shown, but which may be the same as shown in the above mentioned prior application.

A circuit is now closed for operating timing relay HP extending from (+), normally closed Y off normal contact YON of the first selector, break contact of cut through relay CT, conductor HS, make contact of relay SW, conductor and wiper 1HS (corresponding to the same identified units in the above mentioned prior application), terminal and conductor AHS, break contact of relay HL and winding of relay HP to (−). The operation of relay HP closes an obvious circuit from (+) to the common "timer start" conductor for starting the timing mechanism, which in turn connects timing pulses to common conductors TP1 and TP2 in a manner which is familiar to those skilled in this art.

It will be pointed out at this time that a short pulse from (+) is applied to conductor TP1 and then, after a predetermined time interval is measured off, a short pulse is applied to conductor TP2. It will be observed that the TP2 conductor is not effective in the adapter circuit if it should be pulsed before the TP1 conductor after the HP relay is operated. Consequently, the circuit from (+) on conductor TP1 is extended through a make contact of relay HP, break contact of relay HL, break contact and lower winding of relay TM to (−) for operating this latter relay. Relay TM is locked in its operated position over a circuit extending from (+), make contact of relay HP, make contact and lower winding of relay TM to (−). It will now be assumed that the call progresses in the normal manner and that the selector takes its Y step before the TP2 conductor is pulsed following the pulsing of the TP1 conductor.

When the selector takes its Y or secondary step, (+) is removed from conductor AHS for opening up the above described operating circuit for relay HP, but this relay is now locked operated and relay HL is operated over a circuit including the closed line circuit extending from (+), make contact of relay SA, wiper SW and associated terminal, conductor S, make contact of relay CO, break contact of relay LR, conductor SN, break contact of relay LL, winding of relay HL, make contact and winding of relay HP to (−). In the event that the selector takes the Y step before conductor TP1 is pulsed, then relay HL will be operated over the above described circuit, but in this case before relay TM is operated. Consequently, relay TM is operated when relay HL operates over a circuit extending from (+), make contact of relay HP, make contact of relay HL, break contact and lower winding of relay TM to (−) and relay TM is locked in the previously described manner.

Since it is assumed that this call progresses in the normal manner, relays SA and SW of the first selector (or the final selector in the switch train) remain operated until the connection is released, at which time relays SA and SW release for releasing the finder. The release of relay SA (or the SA relay in the final selector) removes positive potential from the conductor including wiper SW of the line finder and conductor S for opening up and releasing relay CO of the calling line. The disconnection of (+) from conductor S also de-energizes conductor SN leading to the connector banks for rendering this line idle and selectable on terminating calls. The disconnection of (+) from conductors S and SN also opens up and releases relays HP and HL. The release of relay HP opens up and releases relay TM. It will be noted that a circuit is closed by way of the lower break contact of relay LL and its lower winding when relay HP is released and before relay HL releases. Since this is a self interrupting circuit to relay LL, this relay will probably buzz for an instant before relay HL has time to restore its contacts to normal, but this buzzing operation is of no effect.

It will now be explained how the line circuit operates when a call is originated at a substation of a party line associated with this line circuit, assuming that this is a reverting call. Relays CO, HP, HL, TM, SA and SW are all in their operated positions, these relays being operated as previously described and relays LR and LL will be in their non-operated positions. The connector sleeve terminal SN will be connected to (+) over the previously described circuit for making this line busy to the connector switches.

As is well understood, reverting call circuits are arranged so that the opening up of the line circuit at the calling station, after the ringing digits have been dialed, conditions the ringing apparatus for ringing back on the calling line without removing (+) potential from the holding or sleeve conductor S. Consequently, the above mentioned relays are all left in their operated and non-operated positions while ringing is taking place and then when the call is answered, either by the calling or by the called party, a relay corresponding to relay SA is released for effecting the release of relay SW, for disconnecting (+) potential from sleeve conductor S, which in turn removes (+) potential from conductor SN and relays CO, HP, HL and TM are released due to the removal of (+) potential from conductors S and SN. Relay HP will release before relay HL and complete a circuit for operating relay LL which may be traced from (+), break contact of relay HP, make contact of relay HL, break contact of relay LL (marked Y to indicate that this contact breaks last on the operation of this relay) and lower winding of relay LL to (—).

Since this release operation is effected in response to the removal of the receiver on the calling line, the closed circuit across this line is now effective to lock relay LL in its operated position over a circuit extending from (+), upper winding of relay LL, make contact of relay LL, line conductor TL, substation circuit, line conductor RL, make contact and lower winding of relay LL to (—). Talking battery is thus supplied to the line through the windings of relay LL and the automatic switching equipment is released. The line is maintained busy in the connector bank by means of a circuit extending from (+), break contact of relay TM, make contact of relay LL and conductor SN to the connector bank terminals. Relay LL closes an obvious circuit for lighting lockout lamp LO as an indication that the line is in its locked out condition.

It will be observed that the release of cut off relay CO places line relay LR across the line circuit, with this circuit being opened by the operation of relay LL. Since relay LL is not operated until after release of relay CO, relay LR may momentarily operate but such operation will be of such short duration as to be ineffective.

When the line circuit is cleared out by both calling and called parties hanging up their receivers, relay LL is released for extinguishing the lockout lamp and for disconnecting (+) from conductor SN, thus rendering this line selectable for incoming calls.

It will now be explained how the circuits function when the line circuit is locked out in response to a permanent condition on the line. The call is originated in the previously described manner for causing the allotted line finder to connect with the calling line, after which relays HP and TM are operated as previously described. Upon the operation of cut-off relay CO in the previously described manner, first line relay LR of the line circuit is released and the connector bank sleeve conductor SN is connected to (+) for making this line busy. Relay HL is not operated because it is assumed that the first selector does not operate in its Y direction for opening contacts YON, as previously described, thus preventing the operation of relay HL and the locking of relay HP. Furthermore, relay TM is in its operated position due to the pulse on common conductor TP1 for operating and locking this relay. Relays SA and SW of the finder-selector link are in their operated positions.

Now when conductor TP2 is pulsed, with relay TM operated and with relay HL non-operated, a circuit previously prepared under the control of first line relay LR following its operation upon the initiation of the call is closed for operating relay LL extending from (+) on conductor TP2, make contact of relay TM, break contact of relay HL, break contact and lower winding of relay LL which may be designated as a lock-out or second line relay to (—). Relay LL operates and locks operated over the line circuit in the previously described manner and relay TM is locked operated over a circuit extending from (+), make contact of relay SA, wiper SW and its associated terminal, conductor S, make contact of relay CO, break contact of relay LR, conductor SN, make contact of relay LL, make contact and upper winding of relay TM to (—). The operation of relay LL closes the previously described circuit for lighting lamp LO as an indication that this line is in its locked out condition. The operation of relay LL also opens up and releases the relays of the finder-selector link, including relay SA, for removing (+) potential from conductor S, which in turn effects the release of relay SW of the link and relay CO of the line circuit, whereby the connection is automatically released if no dialling operation is effected to extend the call within a predetermined interval of time after the initiation of the call. Relay HP of the adapter circuit is released when relay SW releases to open up conductor AHS. Relay TM of the adapter circuit is released when (+) potential is removed from conductor SN and when relay HP releases to open up the locking circuit of relay TM including its lower winding. During the interval between the release of relay SA of the link and the consequent removal of (+) from conductor SN and the release of relay TM for again applying (+) to conductor SN by way of a make contact of relay LL, the line circuit is not protected against seizure in the connector bank, but this is considered unimportant because of the short time interval involved.

This places the line circuit in its locked out condition, in which condition it remains until the permanent condition on the line circuit is cleared, at which time the opening up of the line circuit will effect the release of relay LL for extinguishing lamp LO and for disconnecting (+) from conductor SN which again renders this line non-busy.

In case this line is called and the calling party hangs up the receiver before the called party, none of the relays of the adapter circuit will be operated. Consequently, when (+) potential is removed from sleeve conductor SN at the connector banks, the cut off relay of the line circuit will be released and the line relay will be operated, since the called party still has the receiver off the hook. The operation of the line relay will cause this line to be connected to a selector. Then, if the receiver is not replaced on its hook before the time out operation is effected, the line circuit adapter will be operated by the pulses on conductors TP1 and TP2 for placing this line circuit in its locked out condition until the receiver is replaced, all in the previously described manner.

Having described an automatic telephone system as particularly adaptable for use in connection with a line circuit of the lockout type, it is desired to have it understood that this form is selected to facilitate the disclosure of the invention rather than to limit the number of forms which it may assume; and it is to be further understood that various modifications, adaptations and alterations may be applied to the specific form shown to meet the requirements of practice, without in any manner departing from the spirit or scope of the invention except as limited by the appended claims.

What I claim is:

1. In a line circuit for automatic telephone systems, a first line relay and a second line relay for said line circuit, a cut off relay for said line circuit, a four-conductor link circuit connectable to said line circuit and comprising tip, ring, sleeve and auxiliary conductors, means responsive to a closed circuit condition on said line circuit for operating said first line relay, means responsive to the operation of said first line relay for effecting the connection of said link circuit to said line circuit and the operation of said cut off relay over said sleeve conductor and the consequent release of said first line relay, means controlled in response to the operation of said first line relay and utilizing said auxiliary conductor for preparing a circuit for said second line relay, means for completing said prepared circuit whereby said second line relay is operated, and locking means including said closed line circuit for maintaining said second line relay operated.

2. In an automatic telephone system, subscribers' lines, outgoing four conductor trunks including tip, ring, sleeve, and auxiliary conductors, means for extending a connection from one of said lines to an idle one of said trunks, means for further extending said connection beyond said idle trunk, a timing relay individual to said one line at all times, means operative upon said extension to said trunk for operating said timing relay, and time controlled release means including contacts of said timing relay for automatically releasing said connection if no dialing operation is effected to further extend said connection beyond said idle trunk within a predetermined interval of time after said connection is initiated.

3. In a telephone system, a subscriber's line circuit including a pair of line conductors, a plurality of relays associated with said line circuit, an automatic switch operative to select said line circuit in response to a call originated thereon, a first relay of said plurality operated in response to the selection of said line circuit by said switch, a cyclically operating timing device, means for applying timed pulses to certain contacts of said plurality of relays during each cycle of said timing device, means controlled by one of said pulses and including contacts of said first relay for operating a second relay of said plurality, means controlled by another of said pulses and including contacts of said second relay for operating a third relay of said plurality, and means controlled by the operation of said third relay for disconnecting said automatic switch from said line circuit.

4. In a telephone system, a subscriber's line circuit including a pair of line conductors, a plurality of relays associated with said line circuit, an automatic switch operative to select said line circuit in response to a call originated thereon, a first relay of said plurality operated in response to the selection of said line circuit by said switch, a cyclically operating timing device, means for applying timed pulses to certain contacts of said plurality of relays during each cycle of said timing device, said timing device being operative to apply a first pulse to said line circuit near the beginning of the cycle and a second pulse to said line circuit near the end of each cycle, means controlled by said first pulse and including contacts of said first relay for operating a second relay of said plurality, means controlled by said second pulse and including contacts of said second relay for operating a third relay of said second plurality, and means controlled by the operation of said third relay for disconnecting said automatic switch from said line.

5. In a telephone system, a subscriber's line circuit including a pair of line conductors, a plurality of relays associated with said line circuit, an automatic switch operative to select said line circuit in response to a call originated thereon, a first relay of said plurality operated in response to the selection of said line circuit by said switch, a cyclically operating timing device, means for applying timed pulses to certain contacts of said plurality of relays during each cycle of said timing device, said timing device being operative to apply a first pulse to said line circuit near the beginning of each cycle and a second pulse to said line circuit near the end of each cycle, means controlled by said first pulse and including contacts of said first relay for operating a second relay of said plurality, means for locking said second relay operated independent of said one pulse, means controlled by said second pulse and including contacts of said second relay for operating a third relay of said plurality, means controlled by the operation of said third relay for disconnecting said automatic switch from said line circuit, and means controlled over said line circuit for locking said third relay operated.

6. In an automatic telephone system; a subscriber's line; calling terminals individual to said line; a line lock out adapter between said line and said terminals for providing lock out operation for said line; a first relay connected to said line; means responsive to a calling condition on said line for operating said first relay; a second relay individual to said line; automatic switching apparatus having tip, ring, sleeve, and auxiliary brushes and corresponding sets of terminals; means for causing said switching apparatus to extend connections from said line by way of said terminals in response to the operation of said first relay; means responsive to the operation of said switching apparatus for operating said second relay over said auxiliary conductor; and means responsive to the operation of said second relay for enabling the disconnection of said line from said first relay, said calling terminals, and said switching apparatus.

7. In an automatic telephone system; a subscriber's line; calling terminals individual to said line; a line lock out adapter between said line and said terminals for providing lock out operation for said line; a first relay connected to said line; means responsive to a calling condition on said line for operating said first relay; a second relay individual to said line; automatic switching apparatus having tip, ring, sleeve, and auxiliary brushes and corresponding terminal sets terminating tip, ring, sleeve, and auxiliary conductors; means for causing said switching apparatus to extend connections from said line by way of said terminals and conductors in response to the operation of said first relay; means responsive to the operation of said switching apparatus for operating said second relay over said auxiliary conductor; timing means; and means responsive to the operation of said second relay for rendering operative said timing means for automatically disconnecting said line from said first relay, said calling terminals, and said switching apparatus.

8. In an automatic telephone system; a pair of line conductors individual to a subscriber's line; calling terminals individual to said line; a line lock out adapter between said line conductors and said terminals for providing lock out operation for said line; a line circuit including a first relay individual to said line; means responsive to a calling condition on said line for operating said first relay; a second relay individual to said line; automatic switching apparatus including tip, ring, sleeve, and auxiliary brushes and corresponding terminal sets terminating tip, ring, sleeve, and auxiliary conductors; means for causing said switching apparatus to extend connections from said line conductors by way of said terminals and said conductors in response to the operation of said first relay; means responsive to the operation of said switching apparatus for operating said second relay over said auxiliary conductor; and means responsive to the operation of said second relay for enabling the disconnection of said line conductors from said line circuit, said calling terminals, and said switching apparatus.

9. In an automatic telephone system, a line circuit comprising a line relay and a cut-off relay, a timing relay, a four-conductor link circuit connectable to said line circuit and comprising tip, ring, sleeve, and auxiliary conductors, means responsive to a closed circuit condition on said line circuit for operating said line relay, means responsive to the operation of said line relay for effecting the connection of said link circuit to said line circuit, means responsive to the connection of said link circuit to said line circuit for operating said cut-off relay over said sleeve conductor in order to release said line relay, means responsive to the connection of said link circuit to said line circuit for operating said timing relay over said auxiliary conductor, and means responsive to the operation of said timing relay and the absence of dial pulses for a predetermined time for effecting the disconnection of said line from said line circuit.

10. In an automatic telephone system, a line circuit comprising a line relay and a cut-off relay, a timing relay, a four-conductor link circuit connectable to said line circuit and comprising, tip, ring, sleeve, and auxiliary conductors, means responsive to a closed circuit condition on said line circuit for operating said line relay, means responsive to the operation of said line relay for effecting the connection of said link circuit to said line circuit, means responsive to the connection of said link circuit to said line circuit for operating said cut-off relay over said sleeve conductor in order to release said line relay, means responsive to the connection of said link circuit to said line circuit for operating said timing relay, timing means, means responsive to the operation of said timing relay for rendering operative said timing means, and means responsive to said timing means in the absence of dial pulses for a predetermined time for disconnecting said line from said line circuit.

FRANK KESSLER.

References Cited in the file of this patent

UNITED STATES PATENTS

| Number | Name | Date |
|---|---|---|
| 1,871,300 | Burgener | Aug. 9, 1932 |
| 1,941,085 | Hague | Dec. 24, 1933 |
| 2,170,403 | Goddard | Aug. 22, 1939 |
| 2,183,649 | Kahn | Dec. 19, 1939 |
| 2,183,656 | Ostline | Dec. 19, 1939 |
| 2,300,037 | Saunders | Oct. 27, 1942 |
| 2,572,027 | Horwitz | Oct. 23, 1951 |